US012675162B1

(12) United States Patent (10) Patent No.: US 12,675,162 B1
Shen (45) Date of Patent: Jul. 7, 2026

(54) METHOD AND SYSTEM FOR RECOGNIZING INTERACTIVE OPERATION, DISPLAY TERMINAL, AND STORAGE MEDIUM

(71) Applicant: OpenInterX INC., Wilmington, DE (US)

(72) Inventor: Junxiao Shen, Wilmington, DE (US)

(73) Assignee: Memories.ai Platforms, Inc., Wilmington, DE (US)

( * ) Notice: Subject to any disclaimer, the term of this patent is extended or adjusted under 35 U.S.C. 154(b) by 0 days.

(21) Appl. No.: 18/926,091

(22) Filed: Oct. 24, 2024

(51) Int. Cl.
*G06F 3/01* (2006.01)
*G06F 3/0346* (2013.01)

(52) U.S. Cl.
CPC .............. *G06F 3/014* (2013.01); *G06F 3/017* (2013.01); *G06F 3/0346* (2013.01); *G06F 2203/0331* (2013.01)

(58) Field of Classification Search
CPC ........ G06F 3/014; G06F 3/017; G06F 3/0346; G06F 2203/0331
See application file for complete search history.

(56) References Cited

U.S. PATENT DOCUMENTS

| | | | | |
|---|---|---|---|---|
| 2013/0154952 A1* | 6/2013 | Hinckley | .............. | G06F 3/0346 |
| | | | | 345/173 |
| 2014/0267024 A1* | 9/2014 | Keller | ..................... | G06F 3/014 |
| | | | | 345/156 |
| 2015/0338916 A1* | 11/2015 | Priyantha | .............. | G06F 1/1698 |
| | | | | 345/173 |
| 2016/0034742 A1* | 2/2016 | Kim | ........................ | G06F 21/35 |
| | | | | 382/124 |
| 2016/0077582 A1* | 3/2016 | Song | ..................... | G06F 3/0488 |
| | | | | 345/173 |
| 2016/0203362 A1* | 7/2016 | Huang | .................... | G06F 21/32 |
| | | | | 726/19 |
| 2020/0410222 A1* | 12/2020 | Chang | ................. | G06F 18/2413 |
| 2022/0407550 A1* | 12/2022 | Grétarsson | ............. | H04B 1/385 |

* cited by examiner

*Primary Examiner* — Grant Sitta
(74) *Attorney, Agent, or Firm* — Workman Nydegger

(57) ABSTRACT
A method for recognizing an interactive operation includes: displaying an interactive interface; acquiring control information of the interactive interface transmitted by a smart ring in a system for recognizing an interactive operation; determining an interactive operation corresponding to the control information according to an interaction mode for the interactive interface, the control information and a recognition model library, where the recognition model library includes a recognition model corresponding to at least one interaction mode; and displaying, on the interactive interface, the interactive operation corresponding to the control information.

16 Claims, 3 Drawing Sheets

1

METHOD AND SYSTEM FOR RECOGNIZING INTERACTIVE OPERATION, DISPLAY TERMINAL, AND STORAGE MEDIUM

TECHNICAL FIELD

The present application relates to the technical field of gesture recognition, for example, a method and a system for recognizing interactive operation, display terminal, and storage medium.

BACKGROUND

In recent years, the introduction of an interactive mechanism into a multimedia system to enhance operation convenience has become a popular technology, and gesture recognition has become an important technology that replaces traditional mice, joysticks or remote controls. The gesture recognition technology can provide good human-machine interaction and enhance operation convenience and has received widespread attention in the industry.

In the related art, a wearable device is generally employed for gesture acquisition and recognition. For example, a camera system is disposed on smart glasses, and a camera in the camera system acquires images to capture and recognize a gesture of a user in each frame. Such systems have a relatively high recognition rate.

However, the acquisition manner of the camera system is greatly affected by ambient light, and the gesture cannot be accurately recognized in dim places. Moreover, the capture in all scenarios involves privacy problems, and such devices are heavy and cumbersome to wear, with relatively poor user experience.

SUMMARY

The present application provides a method and a system for recognizing interactive operation, display terminal, storage medium, and a product to implement accurate gesture recognition in different scenarios through a smart ring, thereby reducing a wearing burden.

The present application provides a method for recognizing an interactive operation. The method is applied to a display terminal in a system for recognizing an interactive operation and includes the following:

An interactive interface is displayed.

Control information of the interactive interface is acquired from a smart ring in the system, the control information includes finger motion information and level information, and the level information indicates a pinch state of a finger wearing the smart ring and a finger associated with the finger wearing the smart ring.

An interactive operation corresponding to the control information is determined according to an interaction mode for the interactive interface, the control information and a recognition model library, where the recognition model library includes a recognition model corresponding to at least one interaction mode.

The interactive operation corresponding to the control information is displayed on the interactive interface.

The present application provides a system for recognizing an interactive operation. The system includes a smart ring and a display terminal.

The display terminal is configured to display an interactive interface.

The smart ring is configured to acquire control information of the interactive interface, where the control information includes finger motion information and level information, and the level information indicates a pinch state of a finger wearing the smart ring and a finger associated with the finger wearing the smart ring.

The display terminal is configured to acquire the control information of the interactive interface from the smart ring and determine an interactive operation corresponding to the control information according to an interaction mode for the interactive interface, the control information and a recognition model library, where the recognition model library includes a recognition model corresponding to at least one interaction mode.

The display terminal is configured to display, on the interactive interface, the interactive operation corresponding to the control information.

The present application provides an electronic device. The electronic device includes at least one processor and a memory.

The memory is communicatively connected to the at least one processor. The memory stores a computer program executable by the at least one processor to enable the at least one processor to perform the method of any embodiment of the present application.

The present application provides a computer-readable storage medium. The computer-readable storage medium stores computer instructions configured to, when executed by a processor, cause the processor to perform the method of any embodiment of the present application.

The present application further provides a computer program product. The computer program product includes a computer program configured to, when executed by a processor, cause the processor to perform the method of any embodiment of the present application.

According to the technical solutions in embodiments of the present application, the display terminal performs the following: displaying the interactive interface; acquiring the control information of the interactive interface from the smart ring, where the control information includes the finger motion information and the level information, and the level information indicates the pinch state of the finger wearing the smart ring and the finger associated with the finger wearing the smart ring; determining the interactive operation corresponding to the control information according to the interaction mode for the interactive interface, the control information and the recognition model library, where the recognition model library includes the recognition model corresponding to the at least one interaction mode; and displaying, on the interactive interface, the interactive operation corresponding to the control information. The smart ring provides the control information related to a gesture action, and the display terminal recognizes the control information comprehensively based on the recognition model library in the display terminal and the interaction mode to determine the corresponding gesture and interactive operation and displays the interactive operation on the interactive interface, thereby improving recognition accuracy and a gesture recognition rate and implementing gesture recognition in different scenarios.

DETAILED DESCRIPTION

Terms such as "first" and "second" in the description, claims and drawings of the present application are used to distinguish between similar objects and are not necessarily used to describe a particular order or sequence. It is to be understood that data used in this manner are interchangeable where appropriate so that the embodiments of the present application described herein can be implemented in an order not illustrated or described herein. Additionally, terms "including" and "having" and any variations thereof are intended to encompass a non-exclusive inclusion. For example, the present application not only includes a process, method, system, product or device in a series of steps or units listed in embodiments of the present application but may also include a series of steps or units that are not expressly listed in embodiments of the present application or a system, a product, a device, or a process or method therein.

Figure 1:
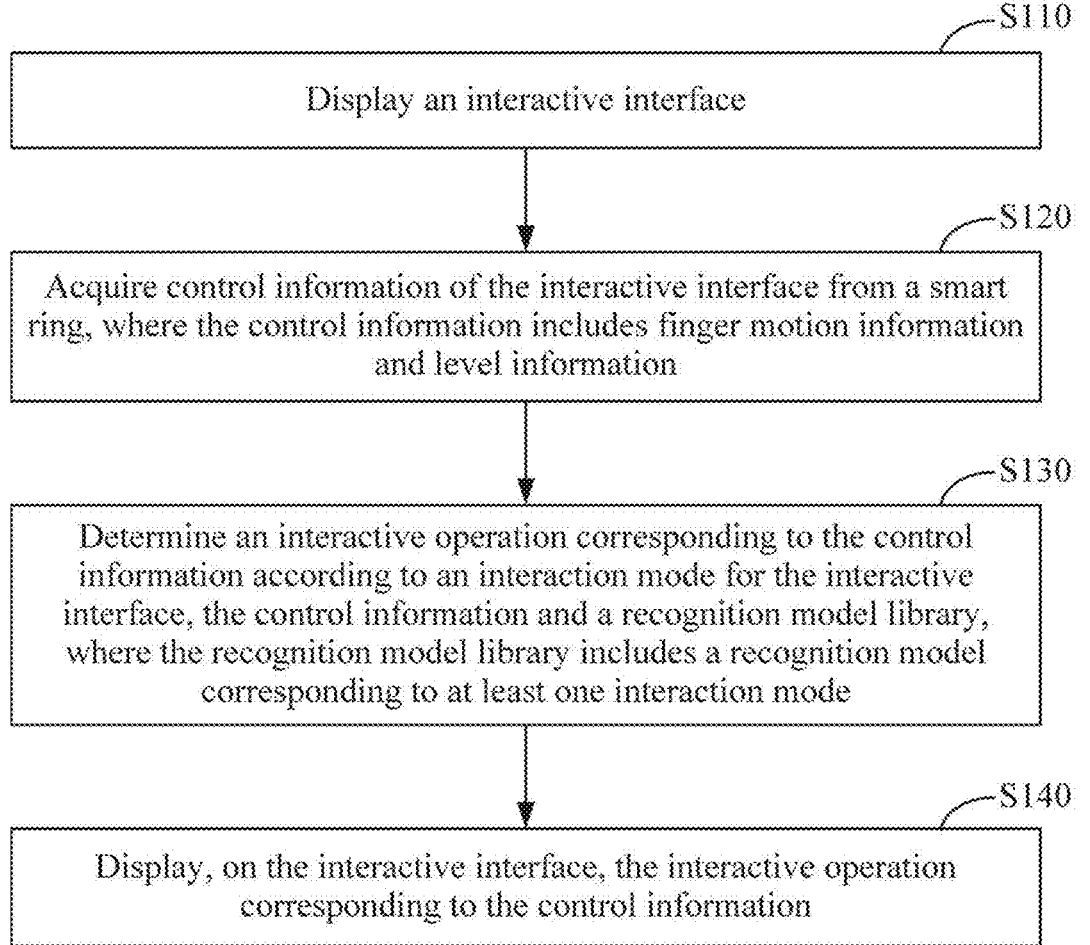
FIG. 1 is a flowchart of a method for recognizing an interactive operation according to an embodiment of the present application.

FIG. 1 is a flowchart of a method for recognizing an interactive operation according to an embodiment of the present application. This embodiment is applicable to the gesture-based control of interaction with an interface. The method may be performed by a display terminal in a system for recognizing an interactive operation. The system includes a smart ring and the display terminal, where the smart ring is communicatively connected to the display terminal. The system may be implemented by hardware and/or software. The display terminal may be configured in an electronic device. As shown in FIG. 1, the method includes S110 to S140.

In S110, the display terminal displays an interactive interface.

In this embodiment, the interactive interface may be understood as a display interface with an interaction function, and an interactive operation may be provided through the smart ring. For example, the interactive interface may be an interface that displays text content, and the interaction function of the interactive interface is correspondingly turning a page left or right or scrolling up or down. The display terminal may be understood as a terminal device with a display function, such as a terminal with a display screen and virtual reality (VR) glasses.

A processor is generally configured in the display terminal. The method may be performed by the processor.

When identifying that a user of the display terminal opens software installed on the display terminal, the display terminal may jump to an interactive interface corresponding to the software and display the interactive interface.

In S120, the display terminal acquires control information of the interactive interface from the smart ring, where the control information includes finger motion information and level information.

The level information indicates a pinch state of a finger wearing the smart ring and a finger associated with the finger wearing the smart ring. The finger wearing the smart ring may be understood as a finger that wears the smart ring, and the finger associated with the finger wearing the smart ring may be understood as a finger forming an action with the finger wearing the smart ring. For example, when the finger wearing the smart ring is a thumb, the finger associated with the finger wearing the smart ring is the other fingers.

In this embodiment, the control information may be understood as information corresponding to a finger action and used for controlling the interactive interface. The finger motion information may be understood as information for representing a finger motion status. For example, the finger motion information may include data such as acceleration, an angular velocity and a direction. The level information may be understood as information for reflecting the pinch state. For example, a high level represents a pinch and a low level represents a release.

Optionally, detection means for detecting a finger motion state are disposed on the smart ring, such as an inertial measurement unit (IMU) and an electric motor. When the display terminal displays the interactive interface for which an interaction instruction may be provided through the smart ring, the processor in the display terminal may send an instruction to the smart ring to trigger the acquisition by the smart ring, or the user of the smart ring may trigger the interaction function through a corresponding switch or operation, so that the smart ring is prevented from misoperating on another interface with which no interaction is required. The smart ring may generate the control information based on the finger motion information and the level information acquired by the smart ring. The processor may acquire the control information of the interactive interface transmitted by the smart ring, where the control information includes the finger motion information and the level information.

In S130, the display terminal determines an interactive operation corresponding to the control information according to an interaction mode for the interactive interface, the control information and a recognition model library, where the recognition model library includes a recognition model corresponding to at least one interaction mode.

In this embodiment, the interaction mode may be understood as a set operation mode for controlling the interactive interface. For example, when the interactive interface is for input, the interaction mode may be a write mode; when the interactive interface is for turning pages, the interaction mode may be a gesture mode. The interactive operation may be understood as an operation function to be implemented on the interactive interface, such as turning a page, a click or input. The recognition model library may be understood as a library that stores models for determining the function corresponding to the control information. The recognition model may be understood as a model for determining the function corresponding to the control information.

It is to be understood that during training of the models, specified actions are performed by the finger wearing the smart ring and the finger associated with the finger wearing the smart ring, original finger motion data and original level data for the specified actions are acquired, the original finger motion data and the original level data are preprocessed (which may include timing segmentation and data classification) so that different types of control data for training and corresponding specified gesture actions in different interaction modes are distinguished, and the models corresponding to the interaction modes are trained by using the control data and the corresponding specified gesture actions. For example, the model may be a deep learning model. A classification model, a translation model and a regression model are trained separately by using the control data for training and the specified gesture actions in the corresponding interaction modes so that recognition models in different interaction modes are obtained finally.

One or more interaction modes may be used for one interactive interface. The processor presets the interaction mode according to a control on the interactive interface or a type of the interactive interface, determines, from the recognition model library, a recognition model corresponding to the interaction mode according to the interaction mode preset for the interactive interface, and inputs the control information into the recognition model to determine the interactive operation corresponding to the control information.

In S140, the display terminal displays, on the interactive interface, the interactive operation corresponding to the control information.

Optionally, the processor in the display terminal may display, on the interactive interface, the interactive operation corresponding to the control information and may also display the next display interface corresponding to the interactive operation.

For example, when the interactive operation is moving a cursor, the processor may display the cursor on the interactive interface and move the cursor according to a corresponding distance in the interactive operation.

The technical solutions in the embodiment of the present application are applied to the display terminal in the system, the system includes the smart ring and the display terminal, and the smart ring is communicatively connected to the display terminal. The technical solutions include displaying the interactive interface; acquiring the control information of the interactive interface transmitted by the smart ring, where the control information includes the finger motion information and the level information, and the level information indicates the pinch state of the finger wearing the smart ring and the finger associated with the finger wearing the smart ring; determining the interactive operation corresponding to the control information according to the interaction mode for the interactive interface, the control information and the recognition model library, where the recognition model library includes the recognition model corresponding to the at least one interaction mode; and displaying, on the interactive interface, the interactive operation corresponding to the control information. The smart ring provides the control information related to a gesture action, the control information is recognized comprehensively based on the recognition model library in the display terminal and the interaction mode so that the corresponding gesture and interactive operation are determined, and the interactive operation is displayed on the interactive interface, thereby improving recognition accuracy and a gesture recognition rate and implementing gesture recognition in different scenarios.

Figure 2:
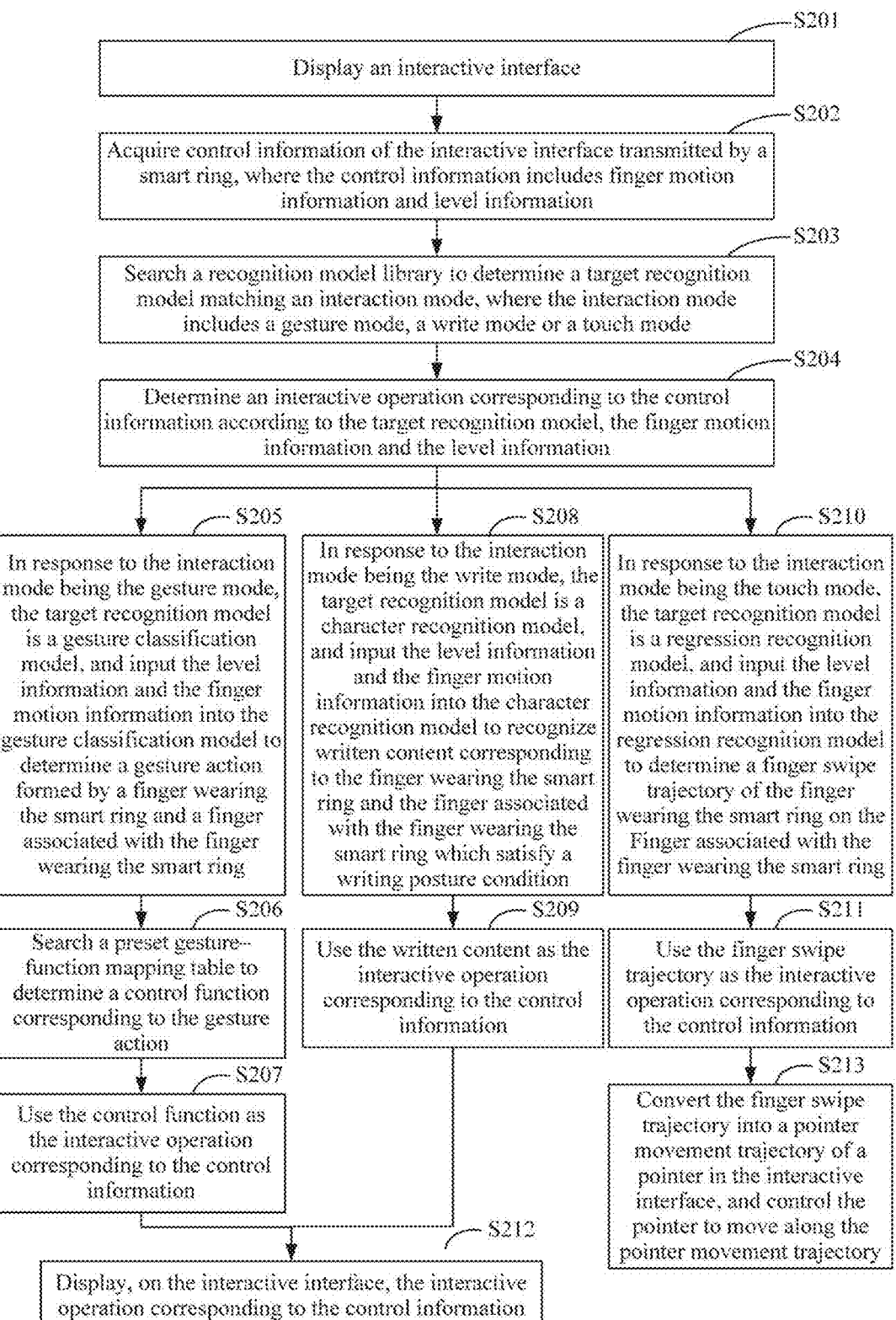
FIG. 2 is another flowchart of a method for recognizing an interactive operation according to an embodiment of the present application.

FIG. 2 is another flowchart of a method for recognizing an interactive operation according to an embodiment of the present application. This embodiment provides a further description of the preceding embodiment. As shown in FIG. 2, the method includes S201 to S213.

In S201, a display terminal displays an interactive interface.

In S202, the display terminal acquires control information of the interactive interface transmitted by a smart ring, where the control information includes finger motion information and level information.

In S203, the display terminal searches a recognition model library to determine a target recognition model matching an interaction mode, where the interaction mode includes a gesture mode, a write mode or a touch mode.

In this embodiment, the target recognition model may be understood as a recognition model for recognizing an interactive operation corresponding to the control information in the interaction mode. The gesture mode may be understood as a mode in which different functions are controlled by different gestures. The write mode may be understood as a mode of writing for input. The touch mode may be understood as a mode for controlling the movement of a cursor.

An association relationship between interaction modes and corresponding recognition models is preset in the recognition model library. A processor may search the recognition model library to determine the target recognition model matching the interaction mode.

In S204, the display terminal determines the interactive operation corresponding to the control information according to the target recognition model, the finger motion information and the level information.

Optionally, the processor in the display terminal may input the finger motion information and the level information into the target recognition model, recognize a current gesture action based on the finger motion information, the level information and the target recognition model, and determine the interactive operation corresponding to the gesture action.

In S205, in response to the interaction mode being the gesture mode, the target recognition model is a gesture classification model, and the display terminal inputs the level information and the finger motion information into the gesture classification model to determine the gesture action formed by the finger wearing the smart ring and the finger associated with the finger wearing the smart ring.

In this embodiment, the gesture classification model may be understood as a model for recognizing the gesture action in the gesture mode. The gesture action may be understood as a gesture for controlling the interactive interface.

When the interaction mode is the gesture mode, the target recognition model is the gesture classification model, and the processor may input the level information and the finger motion information into the gesture classification model to determine, through the gesture classification model, the gesture action formed by the finger wearing the smart ring and the finger associated with the finger wearing the smart ring. For example, the gesture action is a pinch, a leftward or rightward swipe or an upward or downward swipe.

In S206, the display terminal searches a preset gesture-function mapping table to determine a control function corresponding to the gesture action.

In this embodiment, the preset gesture-function mapping table may be understood as a table of a mapping relationship between gesture actions and corresponding functions. The control function may be understood as a function for controlling the interactive interface. For example, a pinch action corresponds to confirmation, an upward swipe corresponds to turning a page up, and a leftward swipe corresponds to turning a page left.

Optionally, the processor in the display terminal may search the preset gesture-function mapping table to determine the control function corresponding to the gesture action.

In S207, the display terminal uses the control function as the interactive operation corresponding to the control information.

Optionally, the processor in the display terminal may use the control function as the interactive operation corresponding to the control information in the gesture mode.

In S208, in response to the interaction mode being the write mode, the target recognition model is a character recognition model, and the display terminal inputs the level information and the finger motion information into the character recognition model to recognize written content corresponding to the finger wearing the smart ring and the finger associated with the finger wearing the smart ring which satisfy a writing posture condition.

In this embodiment, the character recognition model may be understood as a model for recognizing the written content. The writing posture condition may be understood as a posture for representing that content writing is to be performed. The condition is set so that incorrect input can be avoided. For example, the finger wearing the smart ring and the finger associated with the finger wearing the smart ring form a pen-holding posture and are in a non-pinch state, that is, the level information is a low level.

When the interaction mode is the write mode, the target recognition model is the character recognition model, and the processor may input the level information and the finger motion information into the character recognition model to recognize, through the character recognition model, the written content corresponding to the finger wearing the smart ring and the finger associated with the finger wearing the smart ring which satisfy the writing posture condition.

In S209, the display terminal uses the written content as the interactive operation corresponding to the control information.

Optionally, the processor in the display terminal may use the written content as the interactive operation corresponding to the control information in the write mode.

In S210, in response to the interaction mode being the touch mode, the target recognition model is a regression recognition model, and the display terminal inputs the level information and the finger motion information into the regression recognition model to determine a finger swipe trajectory of the finger wearing the smart ring on the finger associated with the finger wearing the smart ring.

In this embodiment, the regression recognition model may be understood as a model for recognizing a correspondence between finger swipe trajectories and display movement trajectories. The finger swipe trajectory may be understood as a trajectory corresponding to a direction in which the finger moves and a distance through which the finger moves.

When the interaction mode is the touch mode, the target recognition model is the regression recognition model, and the processor may input the level information and the finger motion information into the regression recognition model. Since the finger wearing the smart ring swipes on the finger associated with the finger wearing the smart ring to form the pinch state, the regression recognition model determines that the finger swipe trajectory starts when the level information is a high level. The regression recognition model may determine the swipe direction and distance based on the finger motion information to obtain the finger swipe trajectory of the finger wearing the smart ring on the finger associated with the finger wearing the smart ring.

In S211, the display terminal uses the finger swipe trajectory as the interactive operation corresponding to the control information.

Optionally, the processor in the display terminal may use the finger swipe trajectory as the interactive operation corresponding to the control information in the touch mode.

In S212, the display terminal displays, on the interactive interface, the interactive operation corresponding to the control information.

In S213, the display terminal converts the finger swipe trajectory into a pointer movement trajectory of a pointer in the interactive interface and controls the pointer to move along the pointer movement trajectory.

In this embodiment, the pointer may be understood as a visual cursor for indicating a current operation position in the interactive interface.

The processor may convert the finger swipe trajectory into the pointer movement trajectory of the pointer in the interactive interface in a manner such as a regression recognition model or another algorithm and control the pointer to move along the pointer movement trajectory.

According to the technical solutions in the embodiment of the present application, compared with the solution of a camera, the display terminal displays the interactive interface and the smart ring acquires the control information of the interactive interface and transmits the control information to the display terminal, achieving a higher sampling rate, reducing a cost of an acquisition device, avoiding the privacy problems of the camera, reducing a weight worn, and improving the user experience of a wearable interactive device. For example, the display terminal finds the corresponding target recognition model in the recognition model library based on different interaction modes for the interactive interface, which provides a basis for the subsequent accurate recognition of the interactive operation. The display terminal classifies the interaction modes into the gesture mode, the write mode and the touch mode, recognizes the interactive operation corresponding to the control information through the target recognition model corresponding to the interaction mode, determines the gesture action and the corresponding control function in the gesture mode, determines the written content in the write mode or determines the finger swipe trajectory in the touch mode to obtain the interactive operation corresponding to the control information, and displays the interactive operation on the interactive interface. The conversion of the gesture action into the function is implemented, and the interactive interface is controlled by using gestures, thereby improving recognition accuracy and a gesture recognition rate and implementing gesture recognition in different scenarios.

Figure 3:
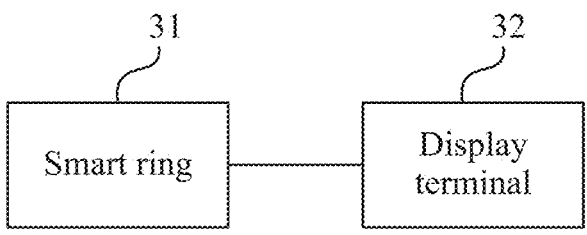
FIG. 3 is a structure diagram of a system for recognizing an interactive operation according to an embodiment of the present application.

FIG. 3 is a structure diagram of a system for recognizing an interactive operation according to an embodiment of the present application. As shown in FIG. 3, the system includes a smart ring 31 and a display terminal 32.

The display terminal 32 is configured to display an interactive interface.

The smart ring 31 is configured to acquire control information of the interactive interface, where the control information includes finger motion information and level information, and the level information indicates a pinch state of a finger wearing the smart ring 31 and a finger associated with the finger wearing the smart ring.

The display terminal 32 is further configured to acquire the control information of the interactive interface transmitted by the smart ring 31 and determine an interactive operation corresponding to the control information according to an interaction mode for the interactive interface, the control information and a recognition model library, where the recognition model library includes a recognition model corresponding to at least one interaction mode.

The display terminal 32 is further configured to display, on the interactive interface, the interactive operation corresponding to the control information.

According to the technical solutions in the embodiment of the present application, the display terminal performs the following: displaying the interactive interface; acquiring the control information of the interactive interface transmitted by the smart ring, where the control information includes the finger motion information and the level information, and the level information indicates the pinch state of the finger wearing the smart ring and the finger associated with the finger wearing the smart ring; determining the interactive operation corresponding to the control information according to the interaction mode for the interactive interface, the control information and the recognition model library, where the recognition model library includes the recognition model corresponding to the at least one interaction mode; and displaying, on the interactive interface, the interactive operation corresponding to the control information. In the embodiment of the present application, the smart ring provides the control information related to a gesture action, and the display terminal recognizes the control information comprehensively based on the recognition model library in the display terminal and the interaction mode to determine the corresponding gesture and interactive operation and displays the interactive operation on the interactive interface so that recognition accuracy and a gesture recognition rate can be improved, thereby implementing gesture recognition in different scenarios.

Optionally, the display terminal 32 is configured to search the recognition model library to determine a target recognition model matching the interaction mode, where the interaction mode includes a gesture mode, a write mode or a touch mode; and determine the interactive operation corresponding to the control information according to the target recognition model, the finger motion information and the level information.

In response to the interaction mode being the gesture mode, the target recognition model is a gesture classification model, and the display terminal 32 is configured to input the level information and the finger motion information into the gesture classification model to determine a gesture action formed by the finger wearing the smart ring and the finger associated with the finger wearing the smart ring; search a preset gesture-function mapping table to determine a control function corresponding to the gesture action; and use the control function as the interactive operation corresponding to the control information.

In response to the interaction mode being the write mode, the target recognition model is a character recognition model, and the display terminal 32 is configured to input the level information and the finger motion information into the character recognition model to recognize written content corresponding to the finger wearing the smart ring and the finger associated with the finger wearing the smart ring which satisfy a writing posture condition; and use the written content as the interactive operation corresponding to the control information.

In response to the interaction mode being the touch mode, the target recognition model is a regression recognition model, and the display terminal 32 is configured to input the level information and the finger motion information into the regression recognition model to determine a finger swipe trajectory of the finger wearing the smart ring on the finger associated with the finger wearing the smart ring; and use the finger swipe trajectory as the interactive operation corresponding to the control information.

When the interactive operation is the finger swipe trajectory, the display terminal 32 is configured to convert the finger swipe trajectory into a pointer movement trajectory of a pointer in the interactive interface and control the pointer to move along the pointer movement trajectory.

The system according to the embodiment of the present application may perform the method according to any embodiment of the present application and has function modules and beneficial effects corresponding to the performed method.

Figure 4:
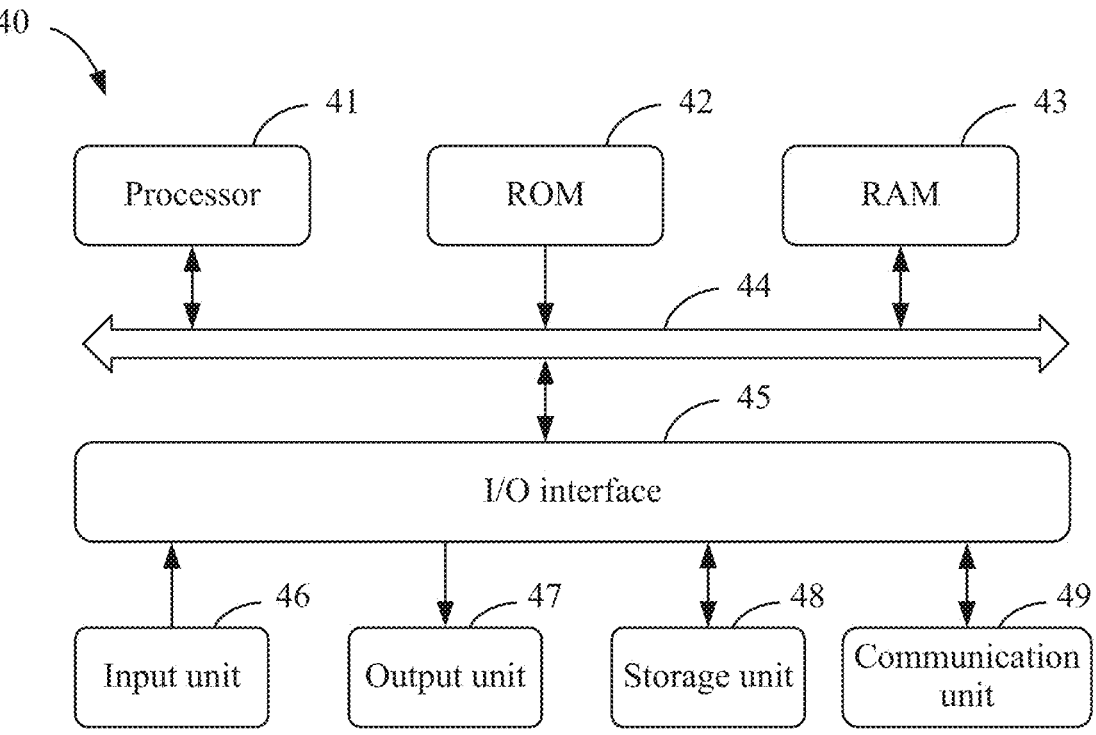
FIG. 4 is a structure diagram of an electronic device according to an embodiment of the present application.

FIG. 4 is a structure diagram of an electronic device 40 that can implement an embodiment of the present application. The electronic device is intended to represent various forms of digital computers, for example, a laptop computer, a desktop computer, a worktable, a personal digital assistant, a server, a blade server, a mainframe computer and an applicable computer. The electronic device may also represent various forms of mobile apparatuses, for example, a personal digital assistant, a cellphone, a smartphone, a wearable device (such as a helmet, glasses and a watch) and a similar computing apparatus. Herein the shown components, the connections and relationships between these components and the functions of these components are illustrative and are not intended to limit the implementation of the present application as described and/or claimed herein.

As shown in FIG. 4, the electronic device 40 includes at least one processor 41 and a memory communicatively connected to the at least one processor 41, such as a read-only memory (ROM) 42 and a random-access memory (RAM) 43. The memory stores a computer program executable by the at least one processor. The processor 41 can perform various appropriate actions and processing according to a computer program stored in the ROM 42 or a computer program loaded into the RAM 43 from a storage unit 48. Various programs and data required for the operation of the electronic device 40 may also be stored in the RAM 43. The processor 41, the ROM 42 and the RAM 43 are connected to each other through a bus 44. An input/output (I/O) interface 45 is also connected to the bus 44.

Multiple components in the electronic device 40 are connected to the I/O interface 45. The multiple components include an input unit 46 such as a keyboard or a mouse, an output unit 47 such as various types of display or speaker, the storage unit 48 such as a magnetic disk or an optical disk and a communication unit 49 such as a network card, a modem or a wireless communication transceiver. The communication unit 49 allows the electronic device 40 to exchange information/data with other devices over a computer network such as the Internet and/or various telecommunications networks.

The processor 41 may be various general-purpose and/or special-purpose processing components having processing and computing capabilities. Examples of the processor 41 include, but are not limited to, a central processing unit (CPU), a graphics processing unit (GPU), a special-purpose artificial intelligence (AI) computing chip, a processor executing machine learning models and algorithms, a digital signal processor (DSP) and any appropriate processor, controller and microcontroller. The processor 41 performs the preceding methods and processing, such as a method for recognizing an interactive operation.

In some embodiments, the method may be implemented as a computer program tangibly included in a computer-readable storage medium such as the storage unit 48. In some embodiments, part or all of computer programs may be loaded and/or installed onto the electronic device 40 via the ROM 42 and/or the communication unit 49. When the computer programs are loaded into the RAM 43 and executed by the processor 41, one or more steps of the preceding method may be performed. Alternatively, in other embodiments, the processor 41 may be configured in any other appropriate manner (for example, by means of firmware) to perform the method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting data and instructions to the memory system, the at least one input apparatus and the at least one output apparatus.

Computer programs for implementation of the methods of the present application may be written in one programming language or any combination of multiple programming languages. The computer programs may be provided for the processor of a general-purpose computer, a special-purpose computer or another programmable data processing apparatus to enable functions/operations specified in a flowchart and/or a block diagram to be implemented when the computer programs are executed by the processor. The computer programs may be executed entirely on a machine, executed partly on a machine, executed as a stand-alone software package, executed partly on a machine and partly on a remote machine or executed entirely on a remote machine or a server.

In the context of the present application, the computer-readable storage medium may be a tangible medium that may include or store a computer program for use by or in connection with an instruction execution system, apparatus or device. The computer-readable storage medium may include, but is not limited to, an electronic, magnetic, optical, electromagnetic, infrared or semiconductor system, apparatus or device or any appropriate combination thereof. Alternatively, the computer-readable storage medium may be a machine-readable signal medium. Examples of a machine-readable storage medium include an electrical connection based on one or more wires, a portable computer disk, a hard disk, a RAM, a ROM, an erasable programmable read-only memory (EPROM), a flash memory, an optical fiber, a portable compact disc read-only memory (CD-ROM), an optical storage device, a magnetic storage device or any appropriate combination thereof.

In order that interaction with a user is provided, the systems and techniques described herein may be implemented on an electronic device. The electronic device has a display apparatus (for example, a cathode-ray tube (CRT), a liquid-crystal display (LCD) or a monitor) for displaying information to the user; and a keyboard and a pointing apparatus (for example, a mouse or a trackball) through which the user can provide input for the electronic device. Other types of apparatuses may also be used for providing interaction with a user. For example, feedback provided for the user may be sensory feedback in any form (for example, visual feedback, auditory feedback or tactile feedback); and input from the user may be received in any form (including acoustic input, voice input or tactile input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with embodiments of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, which is also referred to as a cloud computing server or a cloud host. As a host product in a cloud computing service system, the server solves the defects of difficult management and weak service scalability in conventional physical host and virtual private server (VPS) services.

In an embodiment, an embodiment of the present application provides a computer program product. The computer program product includes a computer program configured to, when executed by a processor, cause the processor to perform the method of any embodiment of the present application.

During implementation of the computer program product, computer program codes for performing the operations of the present application may be written in one or more programming languages or a combination thereof. The programming languages include object-oriented programming languages such as Java, Smalltalk and C++ and further include conventional procedural programming languages such as "C" and similar programming languages. Program codes may be executed entirely on a user computer, executed partly on a user computer, executed as a stand-alone software package, executed partly on a user computer and partly on a remote computer or executed entirely on a remote computer or a server. In the case where the remote computer is involved, the remote computer may be connected to the user computer via any type of network including a LAN or a WAN, or may be connected to an external computer (for example, via the Internet provided by an Internet service provider).

It is to be understood that various forms of the preceding flows may be used with steps reordered, added or deleted. For example, the steps described in the present application may be executed in parallel, in sequence or in a different order as long as the desired results of the technical solutions in the present application can be achieved. The execution sequence of the steps is not limited herein.

What is claimed is:

1. A method for recognizing an interactive operation, the method being applied to a display terminal in a system for recognizing an interactive operation and comprising:
displaying an interactive interface;
acquiring control information of the interactive interface from a smart ring in the system, wherein the control information comprises finger motion information and level information, and the level information indicates a pinch state of a finger wearing the smart ring and a finger associated with the finger wearing the smart ring;

determining an interactive operation corresponding to the control information according to an interaction mode for the interactive interface, the control information and a recognition model library, wherein the recognition model library comprises a recognition model corresponding to an interaction mode of at least one interaction mode; and displaying, on the interactive interface, the interactive operation corresponding to the control information;

wherein determining the interactive operation corresponding to the control information according to the interaction mode for the interactive interface, the control information and the recognition model library comprises:

searching the recognition model library to determine a target recognition model matching the interaction mode, wherein the interaction mode comprises at least one of a gesture mode, a write mode or a touch mode; and determining the interactive operation corresponding to the control information according to the target recognition model, the finger motion information and the level information.

2. The method of claim 1, wherein in response to the interaction mode being the gesture mode, the target recognition model is a gesture classification model; and determining the interactive operation corresponding to the control information according to the target recognition model, the finger motion information and the level information comprises:

inputting the level information and the finger motion information into the gesture classification model to determine a gesture action formed by the finger wearing the smart ring and the finger associated with the finger wearing the smart ring;

searching a preset gesture-function mapping table to determine a control function corresponding to the gesture action; and using the control function as the interactive operation corresponding to the control information.

3. The method of claim 1, wherein in response to the interaction mode being the write mode, the target recognition model is a character recognition model; and determining the interactive operation corresponding to the control information according to the target recognition model, the finger motion information and the level information comprises:

inputting the level information and the finger motion information into the character recognition model to recognize written content corresponding to the finger wearing the smart ring and the finger associated with the finger wearing the smart ring which satisfy a writing posture condition; and using the written content as the interactive operation corresponding to the control information.

4. The method of claim 1, wherein in response to the interaction mode being the touch mode, the target recognition model is a regression recognition model; and determining the interactive operation corresponding to the control information according to the target recognition model, the finger motion information and the level information comprises:

inputting the level information and the finger motion information into the regression recognition model to determine a finger swipe trajectory of the finger wearing the smart ring on the finger associated with the finger wearing the smart ring; and using the finger swipe trajectory as the interactive operation corresponding to the control information.

5. The method of claim 4, wherein displaying, on the interactive interface, the interactive operation corresponding to the control information comprises:

converting the finger swipe trajectory into a pointer movement trajectory of a pointer in the interactive interface, and controlling the pointer to move along the pointer movement trajectory.

6. A system for recognizing an interactive operation, comprising a smart ring and a display terminal;

wherein the display terminal is configured to display an interactive interface;

wherein the smart ring is configured to acquire control information of the interactive interface, wherein the control information comprises finger motion information and level information, and the level information indicates a pinch state of a finger wearing the smart ring and a finger associated with the finger wearing the smart ring;

wherein the display terminal is configured to acquire the control information of the interactive interface from the smart ring and determine an interactive operation corresponding to the control information according to an interaction mode for the interactive interface, the control information and a recognition model library, wherein the recognition model library comprises a recognition model corresponding to an interaction mode of at least one interaction mode; and wherein the display terminal is configured to display, on the interactive interface, the interactive operation corresponding to the control information;

wherein the display terminal is configured to determine the interactive operation corresponding to the control information according to the interaction mode for the interactive interface, the control information and the recognition model library by:

searching the recognition model library to determine a target recognition model matching the interaction mode, wherein the interaction mode comprises at least one of a gesture mode, a write mode or a touch mode; and determining the interactive operation corresponding to the control information according to the target recognition model, the finger motion information and the level information.

7. A display terminal, comprising:

at least one processor; and a memory communicatively connected to the at least one processor;

wherein the memory stores a computer program executable by the at least one processor to enable the at least one processor to perform:

displaying an interactive interface;

acquiring control information of the interactive interface from a smart ring in a system for recognizing an interactive operation, wherein the control information comprises finger motion information and level information, and the level information indicates a pinch state of a finger wearing the smart ring and a finger associated with the finger wearing the smart ring;

determining an interactive operation corresponding to the control information according to an interaction mode for the interactive interface, the control information and a recognition model library, wherein the recognition model library comprises a recognition model corresponding to an interaction mode of at least one interaction mode; and displaying, on the interactive interface, the interactive operation corresponding to the control information;

wherein the at least one processor is further configured to determine the interactive operation corresponding to the control information by:

searching the recognition model library to determine a target recognition model matching the interaction mode, wherein the interaction mode comprises at least one of a gesture mode, a write mode or a touch mode; and determining the interactive operation corresponding to the control information according to the target recognition model, the finger motion information and the level information.

8. The display terminal of claim 7, wherein in response to the interaction mode being the gesture mode, the target recognition model is a gesture classification model; and the at least one processor is further configured to determine the interactive operation corresponding to the control information by:

inputting the level information and the finger motion information into the gesture classification model to determine a gesture action formed by the finger wearing the smart ring and the finger associated with the finger wearing the smart ring;

searching a preset gesture-function mapping table to determine a control function corresponding to the gesture action; and using the control function as the interactive operation corresponding to the control information.

9. The display terminal of claim 7, wherein in response to the interaction mode being the write mode, the target recognition model is a character recognition model; and the at least one processor is further configured to determine the interactive operation corresponding to the control information by:

inputting the level information and the finger motion information into the character recognition model to recognize written content corresponding to the finger wearing the smart ring and the finger associated with the finger wearing the smart ring which satisfy a writing posture condition; and using the written content as the interactive operation corresponding to the control information.

10. The display terminal of claim 7, wherein in response to the interaction mode being the touch mode, the target recognition model is a regression recognition model; and the at least one processor is further configured to determine the interactive operation corresponding to the control information by:

inputting the level information and the finger motion information into the regression recognition model to determine a finger swipe trajectory of the finger wearing the smart ring on the finger associated with the finger wearing the smart ring; and using the finger swipe trajectory as the interactive operation corresponding to the control information.

16

11. The display terminal of claim 10, wherein the at least one processor is further configured to display, on the interactive interface, the interactive operation corresponding to the control information by:

converting the finger swipe trajectory into a pointer movement trajectory of a pointer in the interactive interface, and controlling the pointer to move along the pointer movement trajectory.

12. A non-transitory computer-readable storage medium storing computer instructions configured to, when executed by a processor, cause the processor to perform:

displaying an interactive interface;

acquiring control information of the interactive interface from a smart ring in a system for recognizing an interactive operation, wherein the control information comprises finger motion information and level information, and the level information indicates a pinch state of a finger wearing the smart ring and a finger associated with the finger wearing the smart ring;

determining an interactive operation corresponding to the control information according to an interaction mode for the interactive interface, the control information and a recognition model library, wherein the recognition model library comprises a recognition model corresponding to an interaction mode of at least one interaction mode; and displaying, on the interactive interface, the interactive operation corresponding to the control information;

wherein the processor is further configured to determine the interactive operation corresponding to the control information by:

searching the recognition model library to determine a target recognition model matching the interaction mode, wherein the interaction mode comprises at least one of a gesture mode, a write mode or a touch mode; and determining the interactive operation corresponding to the control information according to the target recognition model, the finger motion information and the level information.

13. The non-transitory computer-readable storage medium of claim 12, wherein in response to the interaction mode being the gesture mode, the target recognition model is a gesture classification model; and the processor is further configured to determine the interactive operation corresponding to the control information by:

inputting the level information and the finger motion information into the gesture classification model to determine a gesture action formed by the finger wearing the smart ring and the finger associated with the finger wearing the smart ring;

searching a preset gesture-function mapping table to determine a control function corresponding to the gesture action; and using the control function as the interactive operation corresponding to the control information.

14. The non-transitory computer-readable storage medium of claim 12, wherein in response to the interaction mode being the write mode, the target recognition model is a character recognition model; and the processor is further configured to determine the interactive operation corresponding to the control information by:

inputting the level information and the finger motion information into the character recognition model to recognize written content corresponding to the finger wearing the smart ring and the finger associated with the finger wearing the smart ring which satisfy a writing posture condition; and using the written content as the interactive operation corresponding to the control information.

15. The non-transitory computer-readable storage medium of claim 12, wherein in response to the interaction mode being the touch mode, the target recognition model is a regression recognition model; and the processor is further configured to determine the interactive operation corresponding to the control information by:

inputting the level information and the finger motion information into the regression recognition model to determine a finger swipe trajectory of the finger wearing the smart ring on the finger associated with the finger wearing the smart ring; and using the finger swipe trajectory as the interactive operation corresponding to the control information.

16. The non-transitory computer-readable storage medium of claim 15, wherein the processor is further configured to display, on the interactive interface, the interactive operation corresponding to the control information by:

converting the finger swipe trajectory into a pointer movement trajectory of a pointer in the interactive interface, and controlling the pointer to move along the pointer movement trajectory.

* * * * *